United States Patent [19]

Karabinis

[11] Patent Number: 4,635,276
[45] Date of Patent: Jan. 6, 1987

[54] ASYNCHRONOUS AND NON-DATA DECISION DIRECTED EQUALIZER ADJUSTMENT

[75] Inventor: Peter D. Karabinis, Atkinson, N.H.

[73] Assignee: AT&T Bell Laboratories, Murray Hill, N.J.

[21] Appl. No.: 758,697

[22] Filed: Jul. 25, 1985

[51] Int. Cl.[4] ............................................. H04B 3/04
[52] U.S. Cl. ........................................ 375/15; 375/14; 375/16; 333/18
[58] Field of Search ..................... 375/12, 14, 15, 16, 375/39; 364/724; 333/18

[56] References Cited

U.S. PATENT DOCUMENTS

| | | | |
|---|---|---|---|
| 3,843,942 | 10/1974 | Pierret et al. | 375/14 |
| 3,890,572 | 6/1975 | Desblanche et al. | 375/15 |
| 4,097,806 | 6/1978 | Evans | 375/13 |
| 4,227,152 | 10/1980 | Godard et al. | 375/13 |
| 4,343,041 | 8/1982 | Forney, Jr. | 375/14 |
| 4,545,060 | 10/1985 | Arnon | 375/14 |

OTHER PUBLICATIONS

Carlson, *Communications Systems*, McGraw-Hill, 1975, pp. 5-7.
IEEE Trans. on Comm. vol. COM-28, No. 11 "Self-Recovery Equalization and Carrier Tracking in Two-Dimensional Data Communication Systems," by D. N. Goddard, pp. 1867-1875.

*Primary Examiner*—Robert L. Griffin
*Assistant Examiner*—Raymond C. Glenny
*Attorney, Agent, or Firm*—David R. Padnes

[57] ABSTRACT

Equalizers, which provide distortion compensation for a modulated carrier signal having a time-varying signal envelope, are adjusted at selected times in response to the signal envelope and the data signals regenerated therefrom. Each selected time corresponds to a time when the signal envelope has a preselected value. Advantageously, the disclosed equalizer adjustment is unaffected by loss of receiver synchronization to the modulated carrier signal and is applicable to a variety of communications systems and modulation formats.

15 Claims, 3 Drawing Figures

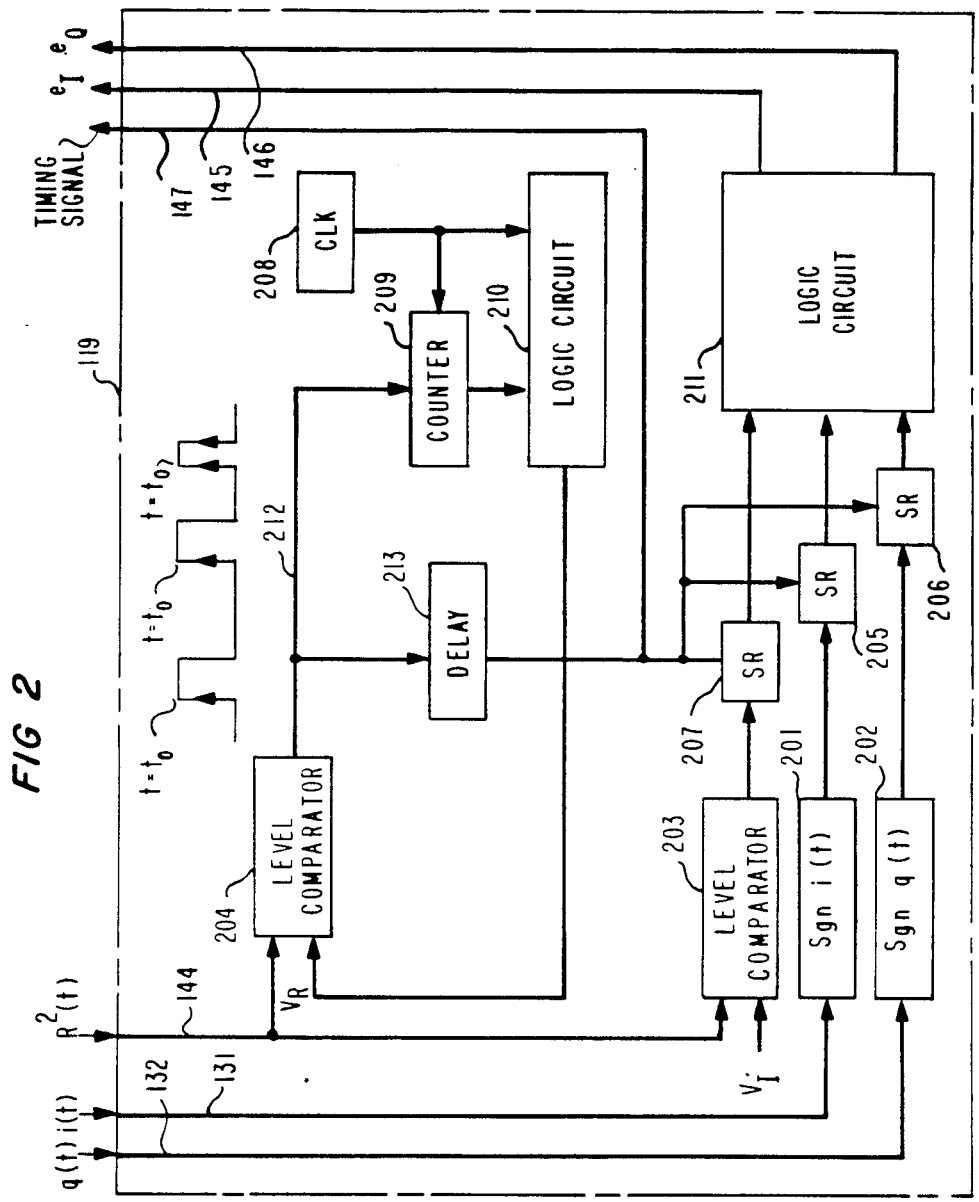

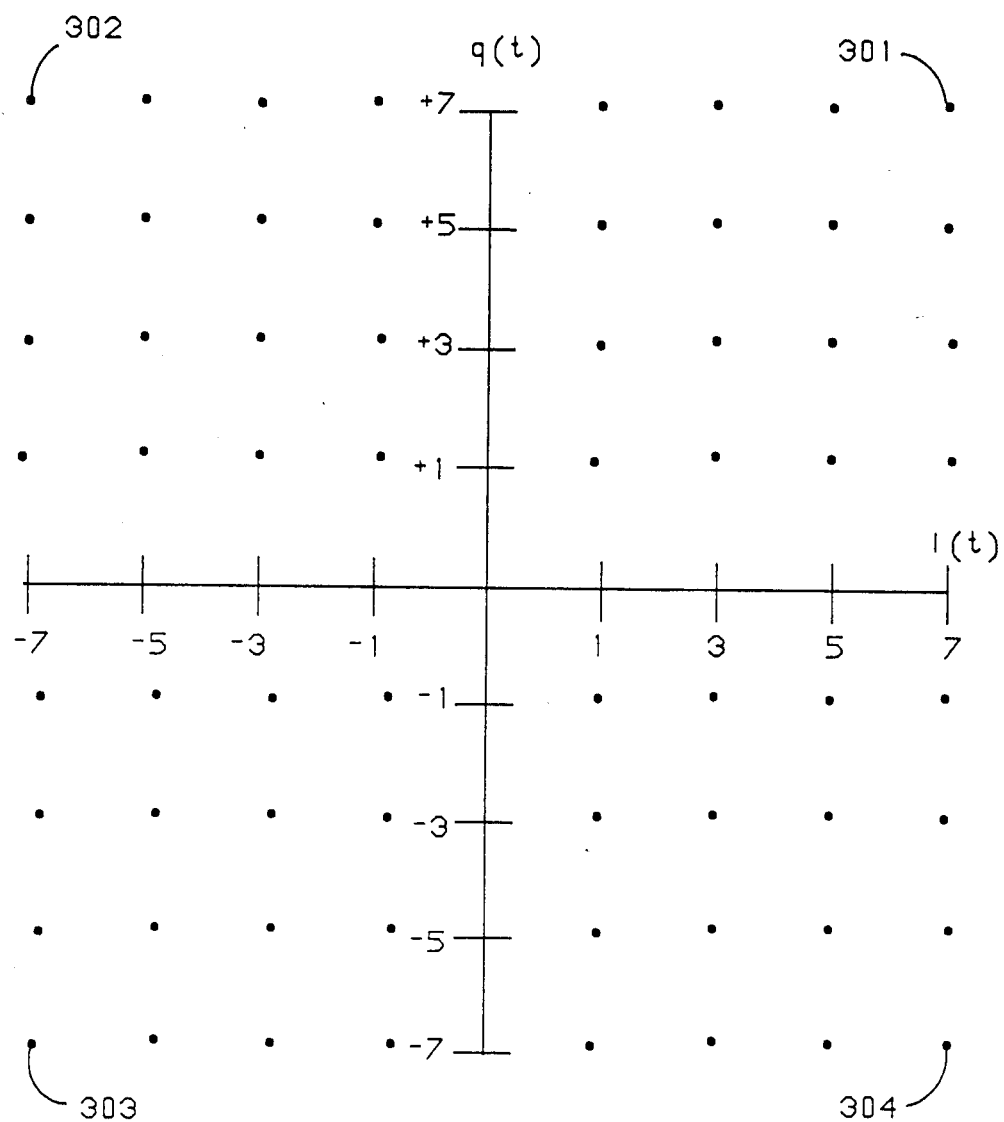

ASYNCHRONOUS AND NON-DATA DECISION DIRECTED EQUALIZER ADJUSTMENT

TECHNICAL FIELD

The present invention relates to a technique for adjusting the tap-weight coefficients of an adaptive equalizer and, more particularly, to such a technique which is asynchronous and is independent of the values of data signals regenerated from a modulated carrier signal.

BACKGROUND OF THE INVENTION

Equalizers, also known as transversal filters, are widely-used devices for compensating for distortion in the transmission channel of a digital communication system. In many applications, the equalizer is designed to be "adaptive", i.e., the compensation provided tracks the variations in transmission channel distortion over time. Such tracking is provided by a variety of schemes which adjust the tap-weight coefficients of the equalizer in response to a derived error signal and the equalizer input or output signal. These schemes are often referred to as being "data decision directed" in that the tap-weight coefficient adjustments are affected by the values of the regenerated data.

A persistent problem in the use of equalizers is that the receiver terminal in which the equalizer is disposed can lose synchronization with the incoming data signal. During such times, the receiver terminal is said to be "out of lock" and the data decision directed algorithms may improperly adjust the tap-weight coefficients. This improper adjustment increases the time needed for the receiver terminal to resume proper operation and this additional delay can be unacceptable for certain communication system applications.

Several techniques, such as those disclosed in an article entitled "Self-Recovering Equalization and Carrier Tracking in Two-Dimensional Data Communication Systems" by Dominique N. Godard, *IEEE Transactions on Communications*, Vol. COM-28, No. 11, November 1980, pages 1867–75, and in a patent application bearing Ser. No. 714,441, and entitled "A Cross-Polarization Canceler/Equalizer", by Gerard J. Foschini, filed May 21, 1985 and assigned to the present assignee, have been devised to provide distortion compensation which is not data decision directed. These techniques, however, require a timing signal which is synchronous with the incoming data signal. Supplying this timing signal when the receiver terminal is out of lock can be difficult, if not impossible. This is especially true in radio systems transmitting a carrier having a particular polarization during periods of severe multipath fading and in radio systems simultaneously transmitting carriers having orthogonal polarizations during periods of even less severe fading. Consequently, a tap-weight coefficient adjustment technique which is asynchronous in operation and which is non-data decision directed would be desirable.

SUMMARY OF THE INVENTION

The present invention overcomes the limitations of the prior art by providing adjustment of the tap-weight coefficients of an equalizer at selected times in response to the time-varying modulated carrier signal envelope and the data signals regenerated therefrom. Each selected time corresponds to a time at which the modulated carrier signal envelope has a preselected value.

A feature of the present technique is that it can be used to supplant prior tap-weight coefficient adjustment algorithms when the receiver terminal is out of lock or it can be used exclusively.

A further aspect of the present invention is that it is applicable to a variety of modulation formats and equalizer structures.

BRIEF DESCRIPTION OF THE DRAWING

FIG. 2 is a block schematic diagram of the error signal generator of FIG. 1; and FIG. 3 is a diagram of an illustrative signal constellation depicting the modulation format used in the communication system of FIG. 1.

DETAILED DESCRIPTION

Figure 1:
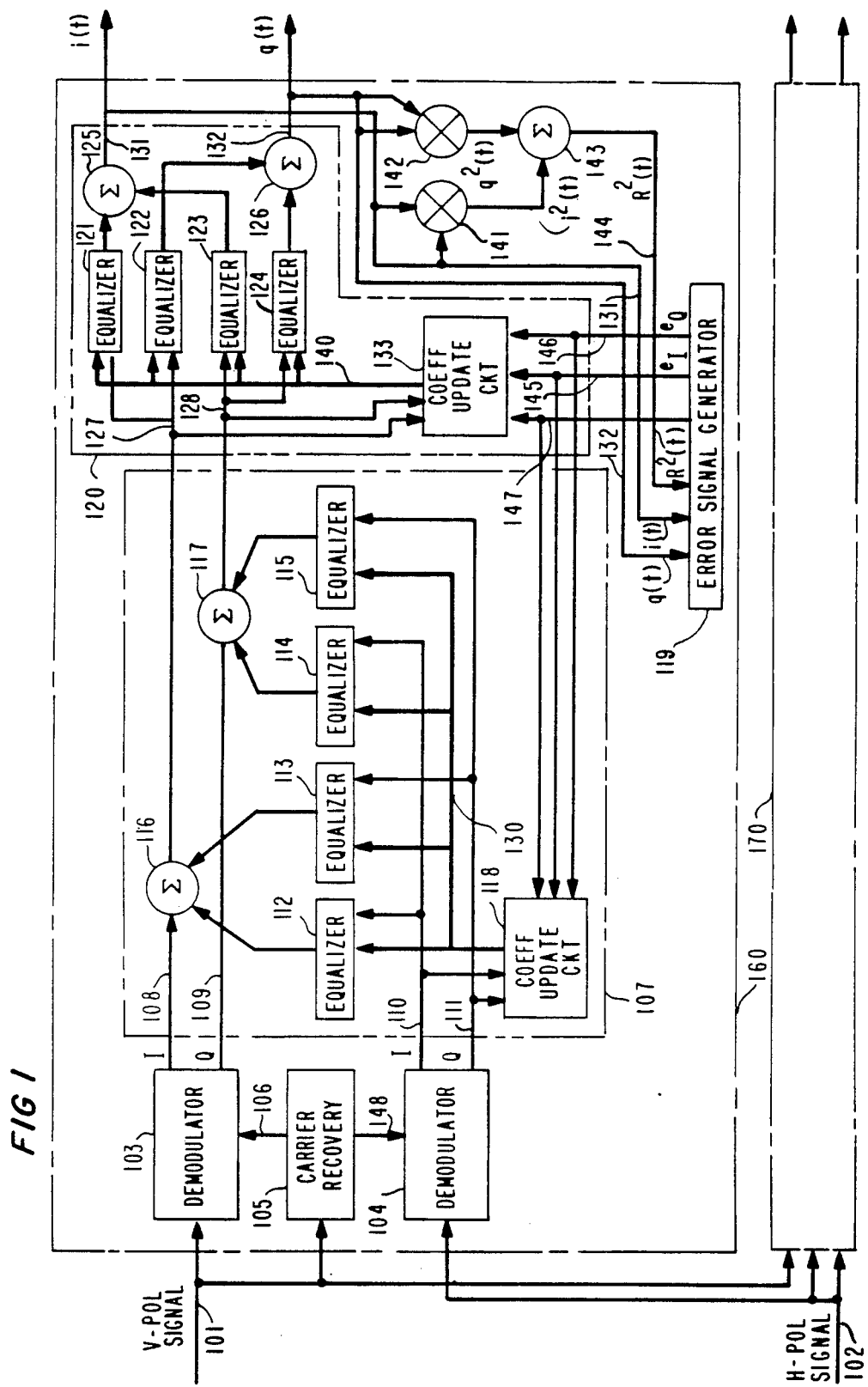
FIG. 1 is a block schematic diagram of a portion of a receiver terminal of a digital communication system incorporating the present invention.

FIG. 1 shows the present invention disposed within a portion of a receiver terminal of an exemplary dual polarization digital radio system utilizing quadrature amplitude modulation (QAM). QAM, also known as amplitude and phase shift keying, is a well-known form of modulation wherein a pair of carriers having a phase angle therebetween of ninety degrees are each amplitude modulated by associated data signals. Each QAM signal, therefore, represents a pair of modulated carrier signals. At the transmitter (not shown), two QAM signals having orthogonal polarizations are simultaneously transmitted. For purposes of simplicity, one of the two orthogonal modulated carrier signals is designated as the vertically polarized or V-POL carrier signal and the other is designated as the horizontally polarized or H-POL carrier signal. After propagating through the transmission channel, these incoming modulated carriers are frequency translated or down-converted to an intermediate frequency (IF) using well-known apparatus. The V-POL and H-POL signals are then respectively coupled to substantially identical receiver portions 160 and 170.

Within each receiver portion, the H-POL and V-POL carrier signals are coupled to demodulators 103 and 104 which generate the in-rail (I) and quadrature (Q) data signals in each incoming carrier signal.

To assure frequency coherence of the I and Q data signals, a reference carrier signal is generated by a carrier recovery circuit within each receiver portion in response to a different one of the carrier signals. As shown in FIG. 1, conventional carrier recovery circuit 105 receives the V-POL modulated carrier signal on lead 101 and generates a reference carrier which is coupled on leads 106 and 148 to demodulators 103 and 104. In receiver portion 170, the reference carrier is generated in response to the H-POL modulated carrier signal.

While the simultaneous transmission of two QAM carrier signals effectively doubles the informationcarrying capacity of a communications link, a variety of factors, such as rainfall, terrain reflections, multipath fading and imperfect antenna alignment, diminish the isolation between the orthogonally polarized carrier signals. As a result, at the receiver terminal, information carried by one designated polarization is corrupted with information carried by the orthogonal polarization. This cross-coupling interference can degrade the quality of the received information below acceptable limits. To avoid this problem, cross-polarization interference canceller 107 receives the I and Q data signals on leads 108, 109, 110, and 111 formed by demodulators 103 and 104.

Canceller 107 includes four conventional transversal equalizers 112, 113, 114, and 115. Equalizers 112 and 113 respectively obliterate via summer 116 the I and Q data signals in the H-POL carrier signal that were coupled into the I data signal in the V-POL carrier signal. Similarly, equalizers 114 and 115 respectively cancel via summer 117 and I and Q data signals in the H-POL carrier signal that were coupled into the Q data signal in the V-POL carrier signal.

Each of the equalizers 112–115 includes a tapped delay line in the signal path, a multiplier connected to each delay line tap for multiplying each tap signal by an associated tap-weight coefficient, and a summing circuit for combining the products formed by each multiplier into the equalizer output signal. Advantageously, each of the equalizers is adaptive in that the tap-weight coefficients are updated so that the compensation provided tracks the distortion in the transmission channel. This updating process for the equalizers within canceller 107 is provided by tap-weight coefficient update circuit 118 which utilizes the well-known LMS algorithm and supplies the updated tap-weight coefficients on bus 130. Circuit 118 is of conventional design except that instead of generating error signals for each equalizer by forming the difference between an equalizer input and the closest one of the ideal data signal values, error signals, as will be described hereinbelow, are supplied from error signal generator 119 on leads 145 and 146. With the LMS algorithm and the configuration of canceller 107, equalizers 112 and 113 have the same error signal, designated as $e_I$, and equalizers 114 and 115 have the same error signal, designated as $e_Q$.

Receiver terminal portion 160 also includes a conventional co-pol equalizer 120 for removing the co-polarization interference and self-rail interference within the I and Q data signals in the V-POL carrier signal. Co-pol equalizer 120 comprises four transversal equalizers 121, 122, 123, and 124 which are identical in structure to the equalizers within cross-polarization canceller 107. Interference in the I data signal on lead 127 is cancelled by equalizers 121 and 123 via summer 125. In similar fashion, interference in the Q data signal on lead 128 is cancelled by adding the outputs of equalizers 122 and 124 using summer 126. The tap-weight coefficients in each of the equalizers within co-pol equalizer 120 are updated by tap-weight coefficient update circuit 133. Bus 140 supplies these updated tap-weight coefficients to co-pol equalizer 120. Update circuit 133 is identical in structure to update circuit 118 and is also connected to error signal generator 119. Error signal $e_I$ on lead 145 is used for revising the tap-weight coefficients of equalizers 121 and 123 and error signal $e_Q$ on lead 146 is used for revising the tap-weight coefficients of equalizers 122 and 124.

Error signals $e_I$ and $e_Q$ can be generated in response to the substantially interference-free, time-varying data signals, designated as i(t) and q(t), appearing on leads 131 and 132 and the time-varying QAM carrier signal envelope. For purposes of convenience, the square of the carrier signal envelope, designated as $R^2(t)$, is utilized in lieu of the carrier signal envelope. $R^2(t)$ is formed from i(t) and q(t) using multipliers 141, 142 and summer 143 and appears on lead 144. It should be noted, therefore, that the data signals i(t) and q(t) are components of the carrier signal envelope.

Refer now to FIG. 2. Data signals i(t) and q(t) are respectively coupled to threshold circuits 201 and 202 which detect the algebraic sign of each of these data signals and generate logic signals indicative thereof. These logic signals are coupled to shift registers 205 and 206. The signal $R^2(t)$ is supplied to level comparators 203 and 204 which respectively compare the voltage level of $R^2(t)$ to thresholds $V_I$ and $V_R$ and output logic "1" signals so long as $R^2(t)$ is equal to or greater than the associated threshold. At other times, comparators 203 and 204 each output a logic "0" signal. Counter 209 and shift register 207 receive these logic signals from comparators 204 and 203, respectively. Threshold $V_I$ is the squared QAM signal envelope for one of the four corner states of a 64 QAM signal constellation in the absence of distortion. Such corner data points, designated as 301, 302, 303, and 304, are shown in FIG. 3 for an illustrative 64 QAM signal wherein the values of i(t) and q(t) each ideally assume the value of $-1$, $\pm 3$, $\pm 5$, or $\pm 7$ volts at the ideal sampling time. Each corner data point is defined as a point in the signal constellation wherein the absolute values of i(t) and q(t) at the ideal sampling time are each a maximum. The squared signal envelope value at all of these corner states is the same.

Threshold $V_R$ is the maximum squared QAM signal envelope voltage irrespective of distortion. This maximum squared envelope voltage, as will be described hereinafter, is adjusted so that the frequency of logic "1" signals from comparator 204 approaches some statistically expected number of occurrences in a predetermined time interval. Clock signal generator 208, counter 209 and logic circuit 210 provide the adjustment of threshold $V_R$.

Consider the data points in the illustrative 64 QAM constellation of FIG. 3. The maximum squared QAM signal envelope will occur when the QAM signal is at one of the corner data points for two successive sampling times. The probability (Pr) of this occurring on two successive sampling times "a" and "b" is: Pr {(301 at "a", 301 at "b") or (302 at "a", 302 at "b") or (303 at "a", 303 at "b") or (304 at "a", 304 at "b")}. Assuming a uniform probability of all 64 data point occurrences and independence between successive data point occurrences, the above probability Pr reduces to $4(1/64)^2$. The expected number of maximum squared QAM signal envelopes occurring in a given time interval is the probability determined above times the number of successive data point pairs transmitted in the predetermined time interval. A data point pair is any two successive data points. For the exemplary dual polarization digital radio system, $7.5 \times 10^6$ successive data point pairs are transmitted in one second yielding approximately 73 expected maximum QAM squared signal envelopes in 0.01 seconds.

Adjustment of threshold $V_R$ will now be described in reference to the statistically expected number of maximum QAM squared signal envelopes. Referring to FIG. 2, clock signal generator 208 provides a CLOCK (CLK) signal having a period of 0.01 seconds which is coupled to counter 209 and initializes the count on the leading edge of each CLK pulse. Between initializations, counter 209 increments its count by one on the leading edge of each logic "1" pulse on lead 212. Illustrative pulses of varying widths are shown. Each pulse has a leading edge which designates a time (t) equal to $t_o$ when the count is incremented. The varying widths reflect the fact that the time interval in which $R^2(t)$ is equal to or greater than $V_R$ varies due to thermal noise or other distortion. Upon each initialization, counter 209 couples the accumulated count to logic circuit 210. If the received count is equal to or greater than 73, logic circuit 210 increments threshold $V_R$ by a preselected amount $\Delta V_R$. If, however, the received count is less than 73, circuit 210 decrements threshold $V_R$ by $\Delta V_R$. As a result, threshold $V_R$ is driven toward the maximum squared QAM signal envelope.

The low-to-high transition of each logic "1" signal on lead 212, after passing delay element 213, also controls the times at which the tap-weight coefficients are adjusted. Delay element 213 introduces a fixed delay of approximately ½ of the baud interval so that each tap-weight coefficient is adjusted when the so-called signal-eyes formed by the superposition of all possible data element transitions over the baud interval has a maximum opening. To provide this control function, the delayed logic "1" signal is used to strobe the contents of shift registers 205, 206 and 207 to logic circuit 211 and is coupled via lead 147 to tap-weight coefficient update circuits 118 and 133.

Logic circuit 211 provides error signals $e_I$ and $e_Q$ having a preselected magnitude and an algebraic sign determined by strobed outputs of level comparator 203 and threshold circuits 201 and 202. When $R^2(t)$ is equal to or greater than $V_J$, logic circuit 211 provides $e_I$ and $e_Q$ with algebraic signs that are the same as the algebraic signs of $i(t)$ and $q(t)$, respectively. When, however, $R^2(t)$ is less than $V_J$, logic circuit 211 provides $e_I$ and $e_Q$ with algebraic signs which are opposite to the algebraic signs of $i(t)$ and $q(t)$, respectively.

The error signals $e_I$ and $e_Q$, generated by the above-described circuitry, have the correct algebraic sign to insure continuous migration of the tap-weight coefficients to these optimum values regardless of whether the receiver terminal is synchronized to the modulated incoming carrier signals and without the need for a synchronized timing signal. Moreover, the magnitude of a $e_I$ and $e_Q$ can be varied so as to minimize coefficient noise and/or control convergence speed.

While the present invention has been described in regard to a particular embodiment, it should of course be understood that numerous modifications may be apparent to those skilled in the art without departing from the spirit and scope of the present invention. First, for example, while the present invention has been disclosed with reference to a particular digital communications system, the present invention is applicable to other digital communication systems wherein the incoming signal has a time-varying signal envelope. These other systems need not employ dual carrier signal polarization and can utilize other modulation formats such as phase shift keying. Second, while the cross-pol canceller and the co-pol equalizer are adjusted by the present invention, either one of these alone can be adjusted. In this regard, if only the equalizers within canceller 107 are to be adjusted, then the squared signal envelope can be formed using either the signals on leads 131 and 132 as shown or the signals on leads 127 and 128. Finally, while error signals $e_I$ and $e_Q$ are continually supplied to tap-weight coefficient circuits 118 and 133, these error signals could be coupled only when the receiver terminal is in the out-of-lock mode by the addition of a switch within each tap-weight coefficient update circuit that toggles $e_I$ and $e_Q$ only when a receiver alarm signal indicating loss of synchronization is present. At other times, each tap-weight coefficient update circuit would use the conventionally generated error signal.

What is claimed is:

1. Apparatus for adjusting an equalizer which compensates for the distortion in a modulated carrier signal comprising component signals and a time-varying signal envelope, said apparatus comprising
    means for extracting data signals individually from said carrier signal, each of said data signals having less distortion than an associated one of said component signals and each of said data signals being a component of said signal envelope,
    means for forming a predetermined combination of said data signals,
    first means for comparing said combination of data signals to a threshold, and
    means responsive to said comparing means for generating an equalizer adjustment signal from said data signals and said combination of data signals.
2. The apparatus of claim 1 wherein said generating means includes second means for comparing each data signal to an associated threshold.
3. The apparatus of claim 1 wherein said second comparing means also compares said combination to a corresponding threshold.
4. The apparatus of claim 3 wherein said data signals and said combination each has an algebraic sign which is determined by said second comparing means.
5. The apparatus of claim 4 wherein said equalizer adjustment signal is a function of the algebraic signs of said data signals and said combination.
6. The apparatus of claim 1 wherein said threshold utilized by said first comparing means is adjustable.
7. The apparatus of claim 6 wherein said first comparing means varies said adjustable threshold in response to the comparison of said combination to said adjustable threshold.
8. The apparatus of claim 6 wherein said first comparing means produces a pulse each time the adjustable threshold is less than said combination.
9. The apparatus of claim 8 wherein said adjustable threshold is varied in response to a comparison of the number of pulses in a given time interval to a statistically expected number of pulses in said time interval.
10. The apparatus of claim 9 wherein each of said data signals has a plurality of signal levels and said statistically expected number of pulses is formed using a uniform probability for said signal levels.
11. The apparatus of claim 1 wherein said forming means multiplies each data signal by itself to form respective products.
12. The apparatus of claim 11 wherein said forming means sums the respective products.
13. The apparatus of claim 12 wherein said forming means determines a square root of the respective products.
14. Apparatus for compensating for distortion in a modulated carrier signal having a time-varying signal envelope, said apparatus comprising
    means for demodulating said carrier signal to form data signals individually, each of said data signals being a component of said signal envelope,
    equalizer means for receiving said data signals and providing distortion compensation, said equalizer means having tap-weight coefficients which affect the compensation provided,
    means for forming a preselected combination of said data signals,
    means for comparing said combination to a threshold, and means responsive to said comparing means for forming an equalizer adjustment signal from said data signals and said combination, said adjustment signal altering said tap-weight coefficients.

15. A method of adjusting an equalizer which compensates for the distortion in a modulated carrier signal comprising component signals and a time-varying signal envelope, said method comprising the steps of extracting data signals individually from said carrier signal, each of said data signals having less distortion than an associated one of said component signals and each of said data signals being a component of said signal envelope, forming a preselected combination of said data signals, determining when said combination has at least a preselected value, and forming said equalizer adjustment signal in response to said data signals and said combination when the latter has at least said preselected value.

* * * * *